United States Patent Office 3,798,136

Patented Mar. 19, 1974

3,798,136

METHOD FOR COMPLETELY FILLING SMALL DIAMETER THROUGH-HOLES WITH LARGE LENGTH TO DIAMETER RATIO

Judith D. Olsen, South Salem, and Lubomyr T. Romankiw, Briarcliff Manor, N.Y., assignors to International Business Machines Corporation, Armonk, N.Y.

Filed June 9, 1972, Ser. No. 261,459

Int. Cl. C23b *5/48, 5/56*

U.S. Cl. 204—15 26 Claims

ABSTRACT OF THE DISCLOSURE

A method and apparatus for plating through large length to diameter ratio holes in a substrate is disclosed. The method consists of forming holes in a substrate which are tapered either by electron beam, or laser drilling, or by forcing an appropriate etchant through a previously drilled hole. The substrates may be of any material and can be either insulating or conductive. In the instance of the former, the substrate should be of such a character that it is amenable to electroless plating or other surface metallizing techniques. After metallizing the tapered hole where the substrate is conductive, the interiors of the tapered holes are electroplated while simultaneously subjecting the tapered portion to agitation by forced convection. Using a prior art plating solution of high throwing power, and forcing it through the tapered holes from the large end toward the small end, causes relatively high deposition rates at the widest portion of the taper which gradually decrease along the length of the taper until the narrow portion is reached where the minimum deposition rate occurs. Under such circumstances, plating occurs non-uniformly along the length of the taper such that the tapered holes are substantially closed without leaving large, unwanted voids which contribute to poor conductivity characteristics. The length of holes which may be filled can be doubled by providing a taper which decreases toward the midpoint of a substrate and from there increases in size until the opposite side of the substrate is reached. Using the same electroplating solution of high throwing power, plating through holes of this character can be accomplished while periodically reversing the direction of flow through the "double taper" holes.

Apparatus for carrying out the above described method consists of an enclosed chamber having inlet and outlet ports through which plating solution under pressure can be forced. Anodes consisting of wire mesh are disposed adjacent to both the inlet and outlet ports while an element containing holes which are to be plated-through forms the cathode and is disposed intermediate the anodes. Where a single taper is used, electroplating solution is forced in one direction but, where a "double taper" is utilized, the flow of electroplating solution is periodically reversed. The method and apparatus of the present invention provides completely plated through-holes which have a length to diameter ratio in excess of 25 and, in addition, have extremely good conductivity characteristics.

BACKGROUND OF THE INVENTION

Field of the invention

This invention relates generally to methods for electroplating through-holes in conductive or non-conductive substrates. More specifically, it relates to a method for electroplating through-holes having large length-to-diameter ratios. The through-holes resulting from the method are substantially completely filled with conductive material while substrate surface portions outside the hole are covered with a much thinner plated layer than that obtained within the through-holes. The results obtained are made possible by tapering the through-holes and by the forced convection of plating solution through the holes to be plated and are much superior to those obtained using prior art techniques.

DESCRIPTION OF PRIOR ART

A complete description will be given hereinafter in the description of preferred embodiments, but let it suffice to say at this point, that the prior art has not dealt successfully with plating through-holes of large length-to-diameter ratio where this ratio has been greater than four or five. Various expedients have been utilized such as: agitation of the plating solution in which the plated part is immersed which disturbs the current distribution on the surface of the substrate and part way into a hole which is to be plated; ultrasonic agitation which causes forced convection which disturbs the current distribution both on the surface of a substrate and inside the holes which are to be filled by plating; agitation by forced flow through the holes which causes forced convection and diverts a large part of the current into the holes; and by simply immersing a substrate in an electroplating solution and permitting plating to occur as a function of the primary current distribution. In the latter instance, a relatively thick diffusion layer is present on the outside surface of the substrate which barely extends into the holes which are to be plated. The degree of filling of the holes with a metal deposit depends on the relative current density inside the hole to that on the surface of the board. The uniformity of plating inside the hole along the length thereof depends on the uniformity of current distribution along the length. In diffusion controlled electroplating processes, the rate of plating depends on the thickness of the diffusion layer at the deposition site. In the absence of agitation, the diffusion layer inside the hole is nearly equal to the length of the holes to be plated, while outside the hole it is thinner due to convection currents set up due to plating. As a result, plating occurs mostly on the surface of the substrate and at the entrance of the holes to be plated. All the other expedients utilized and indicated hereinabove such as forced convection by external agitation or forced convection by ultrasonic agitation, or agitation by force flow through the holes, have as their goals the supply of fresh electroplating solution in the holes and the reduction of the diffusion layer thickness at the surface of the substrate containing the holes to be plated and the extension of the diffusion layer deeply within the holes to be plated. Most of these processes are utilized in conjunction with electroplating baths of high throwing power. While these prior art solutions have succeeded to some extent in depositing a thick metal coat in the holes and making relatively highly conductive platings, this has been accomplished only in holes which have length-to-diameter ratios of approximately five to ten.

A process for accomplishing the plating of holes having the latter length-to-diameter ratio is shown in an article entitled, "A Process for Plating Through-Holes With Very Large Length to Diameter Ratio Using Electroless Deposition Processes" by L. T. Romankiw and J. V. Powers, IBM Technical Disclosure Bulletin, vol. 9, No. 10, March 1967.

Since, in making two sided high density circuit boards, the purpose of plating through-holes is to provide a good electrical connection between two sides of a substrate, it is desirable to have a thick metal deposit inside the holes and to keep the area of the holes small in comparison to the area of the board. Yet, from the point of view of ease of etching the conductors connecting the holes, it is preferable to have a thinner deposit on the surface of the substrate. It is desired, then, to plate at least as thick a deposit inside the hole as on the outer surface of the substrate. However, because of the nature of the prior art plating techniques, the ratio of the deposit thickness inside the holes to that outside the holes, even under the most ideal conditions, can only approximate a value of one, and can never exceed this value except in the instance of aforementioned IBM Publication. Indeed, as the ratio of the hole length (L) to the hole diameter (*d*) becomes large i.e. $L \div d > 5$, the profile of the ratio of the deposit thickness on the surface of the substrate to the deposit thickness inside the hole gradually decreases from approximately 1 at the entrance of the hole to some small value, approximately 0.5 at the center of the hole, and then increases again toward the other end of the hole.

In a recent paper by B. F. Rothschild entitled "The Effective Board Thickness to Hole Diameter Ratio on Plating of Printed Circuits," Plating, April 1966, pp. 437–440, the effect of bath throwing power was reported. The Rothschild study indicates that acceptable plating can be obtained with acid copper in holes with length-to-diameter ratios of up to 5 and with pyrophosphate copper with ratios up to 8 and, with acid gold, ratios up to 14. According to Rothschild, surface-to-hole deposit ratios greater than 5 are not practical for production of multilayer boards. This severely limits the $L \div d$ ratio, especially if hole diameter is reduced to below 10 mils.

As has been previously indicated, the degree of filling of the holes with metal deposits depends on the relative current density inside the hole to that on the surface of the board. Most prior art through-hole plating processes are concentration polarization (diffusion) controlled. In processes of this kind, the rate of plating depends on the thickness of the diffusion layer at the deposition site and therefore on the rate of supply of the metal ions to be discharged. All of the prior art techniques have as their object the modification of the primary current distribution which are controlled either by (a) bath throwing power, (b) additives, (c) agitation in the plating tank on the board surface and not inside the holes, and (d) on the hole length-to-diameter ratio. All of the foregoing expedients and combinations thereof have been utilized to provide better and better through-hole plating processes, but none of the prior art techniques have succeeded in providing through-holes of good conductivity which are substantially filled and have a large length-to-diameter ratio. As the technology progresses, it becomes necessary to plate longer and longer holes that are smaller and smaller in diameter. The smaller diameter holes for plated-through interconnections permit greater circuit density. Thus, $3 \div 1$, or even $10 \div 1$ ratios are small and 20 to 50 mil diameter holes, by future standards, are extremely large. Thus, any technique which would provide for the plating of holes of large length-to-diameter ratios, resulting in substantially completely filling the holes with conductive material, should find widespread and immediate acceptance in the arts involved.

SUMMARY OF THE INVENTION

The present invention generally relates to a method for plating through-holes in either an insulating or conductive substrate. The method of the present invention, in its broadest aspect, comprises the steps of forming at least a single hole in a substrate having at least a single tapered portion and subjecting the tapered portion to plating in at least an electroplating solution or gas and agitating the plating solution by forced convection of the plating solution in at least the direction of decreasing diameter of the hole being plated.

In accordance with more particular aspects of the present invention, the step of plating in at least an electroplating solution includes the step of subjecting the substrate to electroless plating to thermal decomposition of an organometallic complex, or other surface metallizing techniques, where the character of the substrate is insulating.

In accordance with still more specific aspects of the present invention, the step of forming at least a single hole in the substrate includes the step of forming at least a single hole in the substrate having at least an additional tapered portion connected to the first mentioned tapered portion. Under such circumstances, the tapered portions are subjected to plating in a plating solution by forced convection in a direction which is intermittently reversed. In this manner, holes having a length approximately twice the length of a single tapered hole can be completely filled with plated material of good conductivity.

It is, therefore, an object of the present invention to provide a method for plating through-holes of large length-to-diameter ratio by forced convection of an electroplating solution through tapered holes.

Another object is to provide a method of plating large length-to-diameter ratio through-holes while simultaneously depositing metal of smaller thickness on the surface of the substrate containing the holes.

Another object is to provide a method of plating large length-to-diameter ratio through-holes which is simple and amenable to mass production techniques.

Still another object is to provide a method for forming through-holes for both conductive and insulating substrates which provides through-holes of a length approximately twice that of a single tapered hole. This is accomplished by providing a "double taper."

The foregoing and other objects, features and advantages of the present invention will be apparent from following more particular description of preferred embodiments as illustrated in the accompanying drawings.

DESCRIPTION OF PREFERRED EMBODIMENT

To better appreciate the contributions made by the teaching of the present invention, a discussion of the prior art as shown in FIGS. 1–4 is believed to be necessary to place the present teaching in its proper perspective.

Figure 1:
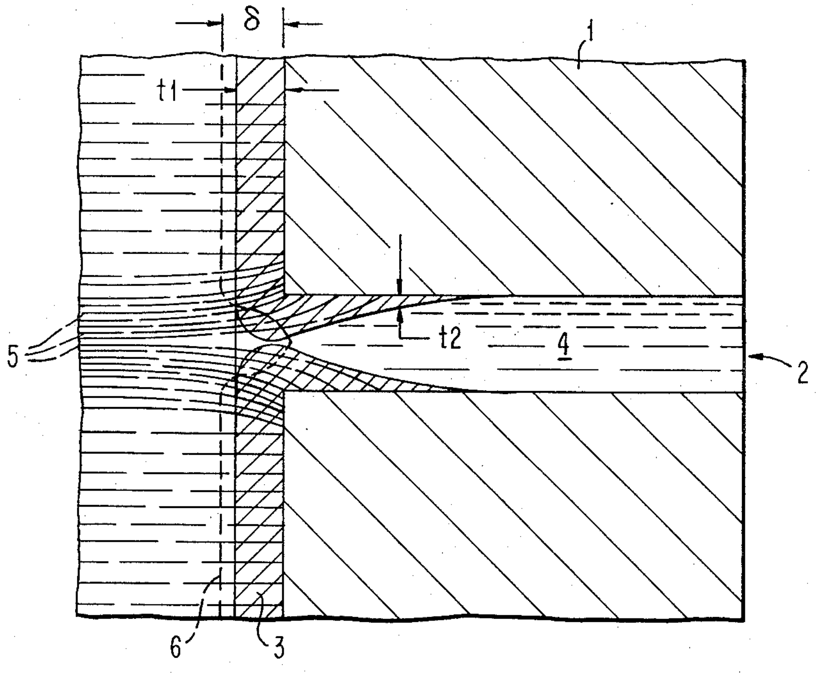
FIG. 1 PRIOR ART
FIG. 1 is a cross-sectional view of a substrate containing a through-hole which is immersed in an electroplating solution. The drawing shows the lines of primary current distribution, the diffusion layer thickness, δ, and the thickness of deposited metal at various points *t1*, *t2* on the substrate, both within and without the hole. The drawing represents a prior art approach to plating through-holes.

Referring now to FIG. 1, there is shown therein a substrate 1 which is conductive because substrate 1 is either totally conductive or the surfaces of an insulating material and the holes therein have been rendered conductive by a previous electroless plating or other metallizing steps which are well known to those skilled in the plating arts. Substrate 1 contains a plurality of through-holes one of which is shown in FIG. 1 and is represented by the reference numeral 2. A metal layer 3 having a thickness $t1$ on the surface of substrate 1 extends partially into through-hole 2 and, is shown therein decreasing to thickness $t2$. Substrate 1 acts as a cathode for an electroplating arrangement (not shown) and is immersed in an electroplating solution 4 which may be any one of a number of well-known electroplating solutions. To avoid any confusion, it should be appreciated that solution 4 completely surrounds substrate 1 both inside and outside hole 2. The diffusion layer shown by the dashed lines in FIG. 1 and having a thickness, $\delta$, is a region which is defined as the region in which the concentration of the depositing metal ion drops from that of the concentration of the bulk of the solution $C_b$ to some much lower concentration at the surface $C_s$ where $C_s <<< C_b$ and may be equal to zero. Lines of primary current distribution 5 indicates the approximate relative current density distribution in the region of hole 2 and at the surface of substrate 1.

In FIG. 1 where substrate 1 is simply immersed in electroplating solution 4, there is neither a forced agitation nor flow involved and the highest current density is present at the entrance to hole 2. This is due to the primary current distribution 5 and results in rapid sealing up of hole 2 with little or no plating at all on the inside walls of hole 2. It can be shown the current would reach only to within 0.5 mil to 1.0 mil into hole 2. As a result, the inner part of hole 2 experiences no current. It should also be noted that the thickness, $\delta$, of diffusion layer 6 is rather thick and results from the fact that there is no agitation being applied to the arrangement of FIG. 1. It should also be noted that the thickness of the elecroplated metal layer 3 is greater at $t1$ than at $t2$. Under such circumstances, it should be clear that through-holes of very small depth can only be plated, if at all, where neither agitation nor flow of the plating solution is utilized.

Figure 2:
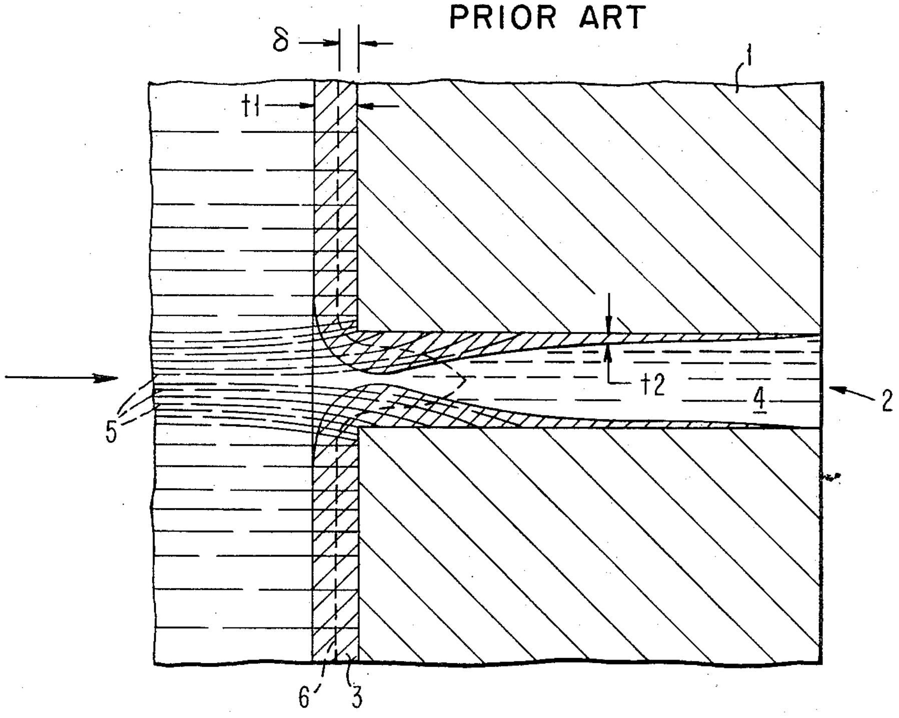
FIG. 2 PRIOR ART
FIG. 2 is a cross-sectional view of a substrate containing a through-hole immersed an electroplating solution. The drawing of the prior art technique shows the primary current distribution which results from external agitation of the electroplating solution. Under such circumstances the primary current distribution covers the surface of the substrates but extends further into the hole than in the instance of FIG. 1. The diffusion layer thickness δ which has been reduced as a result of the external agitation is shown and, the resulting metallization of various thicknesses, *t1*, *t2*, at a number of points within and without the hole is also shown.

Referring now to FIG. 2, an arrangement similar to FIG. 1 is shown except that electroplating solution 4 is agitated externally of hole 2 causing diffusion and current penetration which is quite shallow even though it represents an improvement over the technique discussed in connection with FIG. 1. In the approach of FIG. 2, external agitation of the plating solution reduces the thickness $\delta$ of diffusion layer 6 so that it is much smaller than in the instance of FIG. 1. The approach of FIG. 2, like the approach of FIG. 1, provides a relatively high current density at the entrance to the hole and results in rapid sealing up of the hole with little or no plating on the inside wall. In FIG. 2, it can be seen that the external agitation, while it results in rapid sealing of the hole with little plating within the hole, represents a decided improvement over the technique of FIG. 1. The recognition that agitation of electroplating solution 4 provided improved results led to the approach of FIG. 3.

Figure 3:
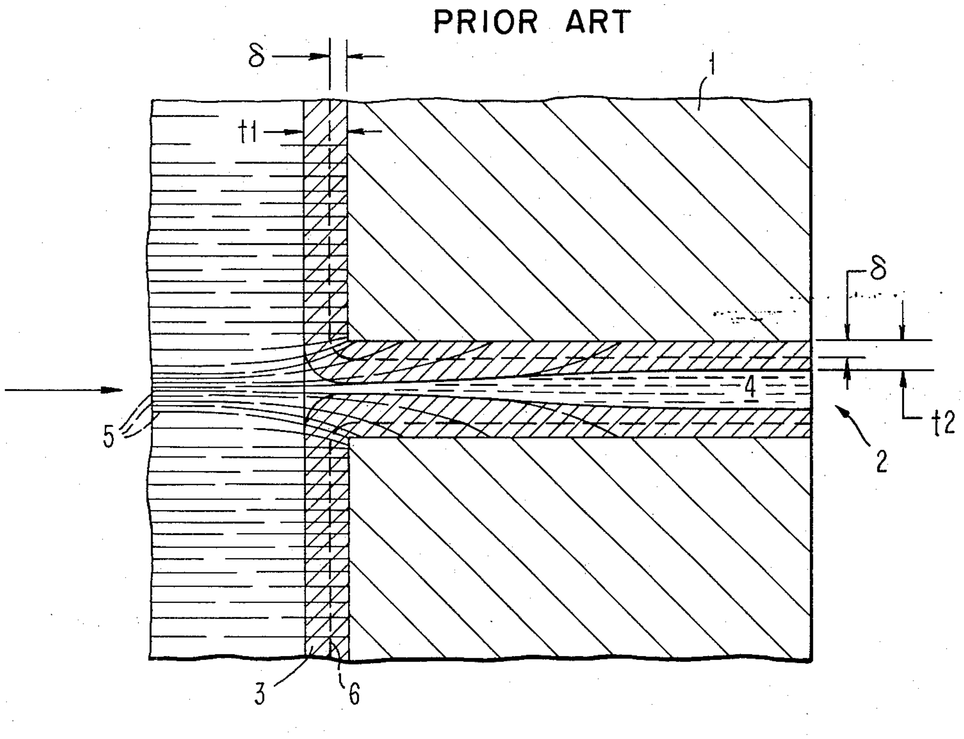
FIG. 3 PRIOR ART
FIG. 3 shows a substrate containing a hole to be plated into which the primary current distribution extends to a much greater depth than that shown in either FIG. 1 or FIG. 2. The extension of the primary current distribution in this manner results from ultrasonic agitation of the electroplating solution and represents a prior art approach to plating through-holes. The diffusion layer thickness δ and thicknesses of deposited metal, *t1*, *t2*, both within and without the hole, are also shown.

Referring now to FIG. 3, this figure is similar to that shown in FIGS. 1 and 2 except that the current distribution 5 extends to a much greater depth than that shown in either of the previous figures. The extension of the current 5 to a greater depth within hole 2 results from the ultrasonic agitation of electroplating solution 4. It should be noted that the thickness $\delta$ of diffusion layer 6 is even smaller than in the previous two figures and that plating is obtained within hole 2 to a greater degree than previously even though a build up of electroplated material occurs at the entrance of hole 2 due to the high current density at the entrance of hole 2.

It should be noted that under conditions of ultrasonic agitation the thickness $t1$ of metal layer 3 on the surface of substrate 1 is of approximately the same thickness as the deposit at the entrance of hole 2 but that it is somewhat larger than the thickness $t2$ of metal layer 3 deep within hole 2. Under such circumstances, while a considerable improvement in plating the interior of hole 2 results from ultrasonic agitation, the results obtained are those which provide only satisfactory and in many cases only marginally acceptable large $L/d$ ratio through-holes. This results from the rapid closing of the hole by a build-up of layer 3 at the entrance of hole 3 which, in turn, causes depletion of plating material from solution 4 which is disposed internally of hole 2. Since plating material or the electrical current can no longer be supplied due to the closure of hole 2 at its entrance, plating is, in effect, self-limiting and voids are created which entrap the plating solution; a situation which contributes to poor conductivity of the resulting plated holes. It should be appreciated in FIG. 3 and all the previous figures that dashed line 6, which shows the depletion layer, is positioned to show a region where the bulk concentration begins to change to lower concentrations as a result of the discharge of ions onto the surface of substrate 1 at the outset of the electroplating step. Under the agitation conditions postulated for each figure, the diffusion layer thickness, $\delta$, remains substantially the same during plating and is spaced a distance equal to the thickness, $\delta$, from the surface of plated layer 3 even as layer 3 increases in thickness during the plating step. Thus, where only ionic agitation is present, the thickness, $\delta$, of the diffusion region is quite large. Where agitation externally of hole 2 is provided as it is in FIG. 2, the thickness, $\delta$, of diffusion layer 6 becomes smaller. When ultrasonic agitation as shown in FIG. 3, is provided the thickness, $\delta$, of depletion layer 6 becomes still smaller.

Under the circumstances thus far discussed, it should be noted that as the depletion layer thickness, $\delta$, becomes smaller and smaller, layer 3 is deposited at a higher and higher rate and closure of hole 2, to the extent possible under the circumstances shown, is accomplished rather quickly. In FIGS. 1–3 it should be noted that the thickness of layer 3 at $t1$ gradually decreases because the current penetrates further and further into hole 2 and because, in the instance of FIG. 3, the thickness, $\delta$, of diffusion layer 6 is approximately the same at the surface of substrate 1 and within hole 2. As a result, the plating rates are substantially the same and the thickness of layer 3 at both $t1$ and $t2$ is almost the same. Under these conditions, it should be clear that the ratio of the thickness $t2$ of layer 3 inside the hole to the thickness $t1$ at the surface of substrate 1 is some value less than 1.

Reconsidering now the prior art approaches previously indicated, it can be seen that better and better through-hole plating has been achieved but much room for improvement has been left both in terms of obtaining highly conductive holes by substantially completely filling the holes with plated metal and in terms of ratios of plating thickness inside the plated holes to thickness of plated material outside the holes which are greater than 1. It thus appears that agitation applied at the proper place can, by the reduction of the thickness, $\delta$, of diffusion layer 6, control the rate of plating and the amount deposited. Thus, in FIG. 3, where diffusion layer 6 has the thickness, $\delta$, as shown, the deposition rate is substantially the same everywhere and, for a given deposition time, deposits a metallic layer 3 having thicknesses $t1$, $t2$ which are almost identical. The approach of FIG. 3, however, does not really provide holes which are substantially filled while at the same time having a deposit outside the hole which is substantially thinner than the deposition inside through-hole 2.

Figure 4:
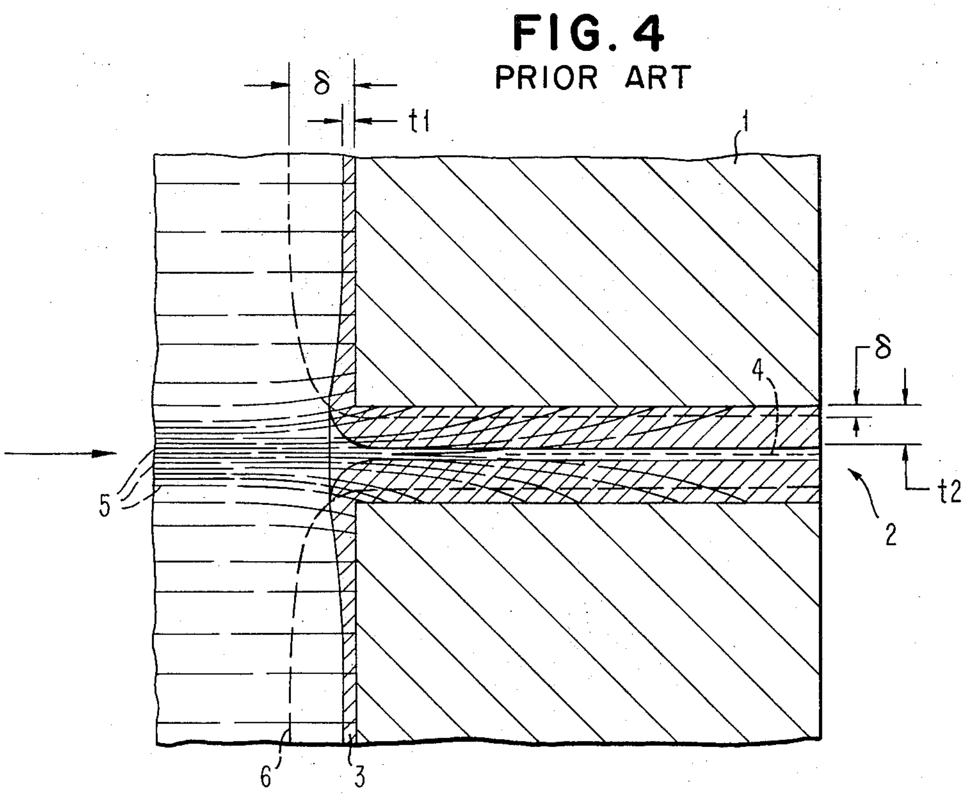
FIG. 4 PRIOR ART
FIG. 4 is a cross-sectional view of a substrate containing a through-hole which is to be plated immersed in plating solution which is agitated by forced flow through the hole. In this prior art instance, the primary current distribution extends rather deeply into the hole having been diverted by forced convection. The diffusion depth δ and the thicknesses, *t1*, *t2*, of metal deposited at various points within and without the hole are also shown.

FIG. 4 which is a cross-sectional view of a substrate similar to that shown in the previous figures and which contains a through-hole 2 provides a solution to the problem of having thinner deposited metal layers outside the hole than within the hole while at the same time substantially completely filling hole 2. In FIG. 4, electroplating solution 4 is forced through hole 2 to provide agitation deeply within through-hole 2. In this instance, the electrical current 5 extends deeply into hole 2 having been diverted therein by the forced convection of electroplating solution 4. In the prior art arrangement of FIG. 4, the thickness, $\delta$, of diffusion layer 6 outside of hole 2 is substantially thicker than the thickness, $\delta$, of diffusion layer 6 inside hole 2. This results from the fact that by forcing plating solution 4 through hole 2, solution 4, at the surface of substrate 1 outside of hole 2, is relatively undisturbed and results in a diffusion layer 6 which is rather thick. Under such circumstances, the deposition rate of metal layer 3 outside of hole 2 is considerably less than the deposition rates of metal layer 3 inside of hole 2 where diffusion layer 6 has been substantially reduced as a result of agitation due to forced convective flow through hole 2. In the arrangement of FIG. 4, the ratio of thicknesses $t2/t1$ is, for the first time greater than 1. The technique of FIG. 4 achieves to some extent control of deposition rates by controlling the thickness of diffusion layer 6 at different places on substrate 1. However, due to the high current density at the entrance and the depletion of plating material from solution 4 deep within hole 2, a build-up of plating occurs at the entrance to hole 2 which causes sealing of hole 2 at the entrance leaving voids within hole 2 which are filled with depleted plating solution. To the extent that the teaching of the present invention improves upon the prior art arrangement of FIG. 4, it is the best approach presently available, but, as will be seen, the technique of FIG. 4 is neither the ultimate nor best solution.

Figure 5:
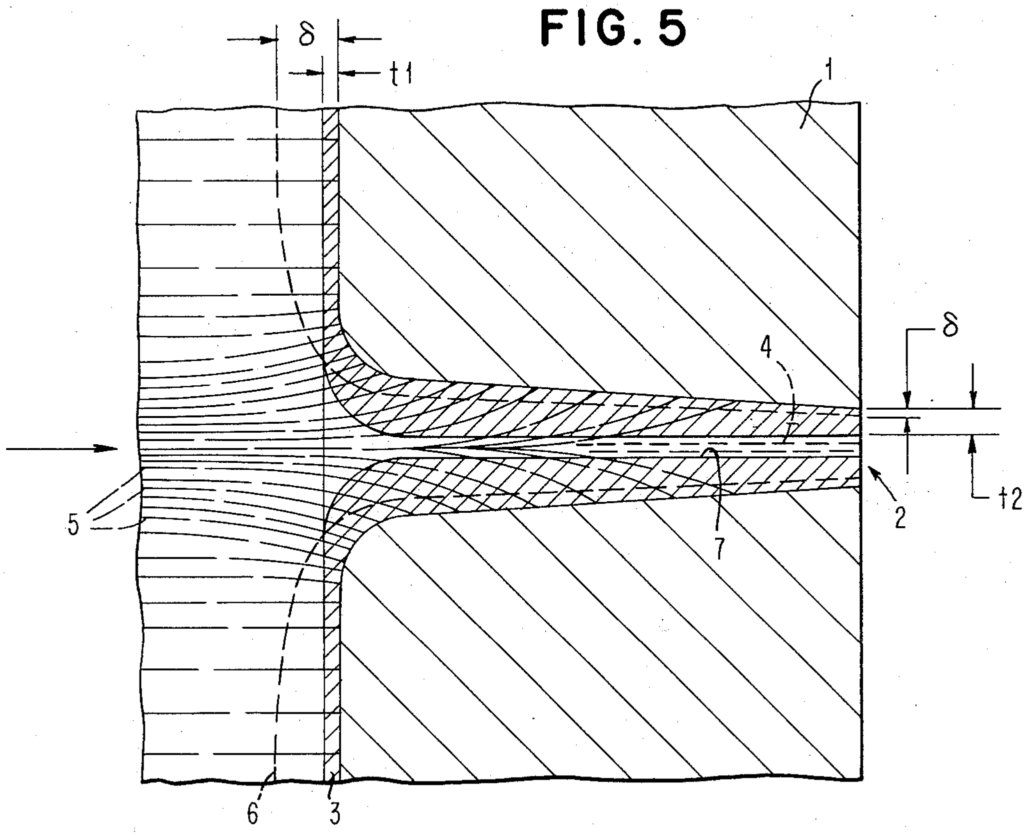
FIG. 5 is a cross-sectional view of a substrate containing a tapered through-hole which is to be plated immersed in a plating solution which is agitated by forced flow through the hole. In this instance, the primary current distribution extends deeply into the hole, having been diverted therein by forced convection. The diffusion depth, δ, is very small and the ratio of the thickness, *t2*, of plating within the hole to the thickness, *t1*, of plating on the surface of the substrate is much greater than 1.

Referring now to FIG. 5, there is shown therein a cross-sectional view of a substrate 1 containing a tapered through-hole 2 which is to be plated immersed in a plating solution 4 which is agitated by forced flow through hole 2. In this instance, the current extends deeply into hole 2, having been diverted therein by the forced convection. The thickness, $\delta$, of diffusion layer 6, in FIG. 5, varies from a relatively large value at the surface of substrate 1 outside of hole 2 to a final thickness which is very small deeply within tapered hole 2. As a result of the taper-velocity-concentration relationship which results from tapering hole 2 and controlling the depth, $\delta$, of diffusion layer 6, metal layer 3 has a higher deposition rate at the entrance of hole 2 than it does deeply within hole 2 and the deposition rate gradually decreases along the length of the taper. It should also be noted in FIG. 5 that the primary current distribution 5 extends deeply within tapered hole 2 and is less highly concentrated at the entrance of tapered hole 2 than in the instances of the previously discussed figures. As a result of the control of all the parameter just mentioned, as plated layer 3 gradually builds up within hole 2, a channel 7 of decreasing diameter is formed lengthwise of tapered hole 2. In this dynamic deposition regime, the build-up of layer 3 is greatest at the wide end of tapered hole 2 and least at the narrow end of tapered hole 2. As a result, at any given instant, the diameter along the length of channel 7 is substantially the same.

The mechanics of plating a tapered hole are based on the fact that the gradually decreasing taper causes higher and higher velocities as the plating solution 4 is forced through tapered hole 2. As the velocity increases, the agitation of solution 4 also increases and the thickness $\delta$ of diffusion layer 6 is decreased. In connection with the latter, it might appear that with a diffusion layer 6 of decreasing thickness $\delta$, that one would obtain a higher plating rate where diffusion layer 6 is smallest. However, this is not the case. In the first place, the current available deeply within the hole is less than at a point near the entrance to hole 2. Since the amount of material plated out of solution is a function of current, it follows that less plating will occur where there is less current. Also, it should be appreciated that plating solution 4 is being depleted of plating material and the less material for plating is available the deeper the hole is penetrated by plating solution 4. The fact that the diffusion layer thickness $\delta$ decreases in thickness the further tapered hole 2 is penetrated, merely compensates for the fact that there is less current and fewer plating ions available as hole 2 tapers down. It should also be appreciated that the level of bulk concentration keeps decreasing as solution 4 penetrates into hole 2 and this, by itself, contributes to the decreasing thickness, $\delta$, of diffusion layer 6. Thus, it appears that parameters such as current, plating material and concentration which decrease are compensated in part by the increased velocity of plating solution through tapered hole 2 and in part by the fact that the taper itself requires lower and lower deposition rates of plating material along the length of the taper. Thus, a high deposition rate at the entrance to hole 2 and a low deposition rate deep within hole 2 provides a build-up of plating which results in a channel 7 of uniform diameter.

In FIG. 5, because the plating rates are compensated for by the increase in velocity and the taper of hole 2, plating solution 4 encounters only a channel 7 which has the same diameter (which is changing from instant to instant) at any given instant. Thus, no large build-up of layer 3 is obtained anywhere which can cut off the flow of plating solution 4. Channel 7 can then decrease in size until only the hydraulic resistance of the channel prevents the further flow through of plating solution 4. Finally, tapered hole 2 is almost completely filled with plating material 3 with the exception of a small diameter hole of hair-like dimensions down through the center of hole 2. From the point of view of conductivity characteristics, the effect of this hair-like channel 7 in the finished product is negligible. Test results have shown that plating solution contained within channel 7 after plating stops can be easily removed by blowing channel 7 clear with compressed air and rinsing with water, alcohol, acetone, or Freon.

From the foregoing, it should be clear that the combination of agitation by forced convection and the tapering of hole 2 has provided a degree of control over the large number of parameters involved in electroplating which were heretofore unobtainable using the prior art approaches of FIGS. 1–4.

Figure 6:
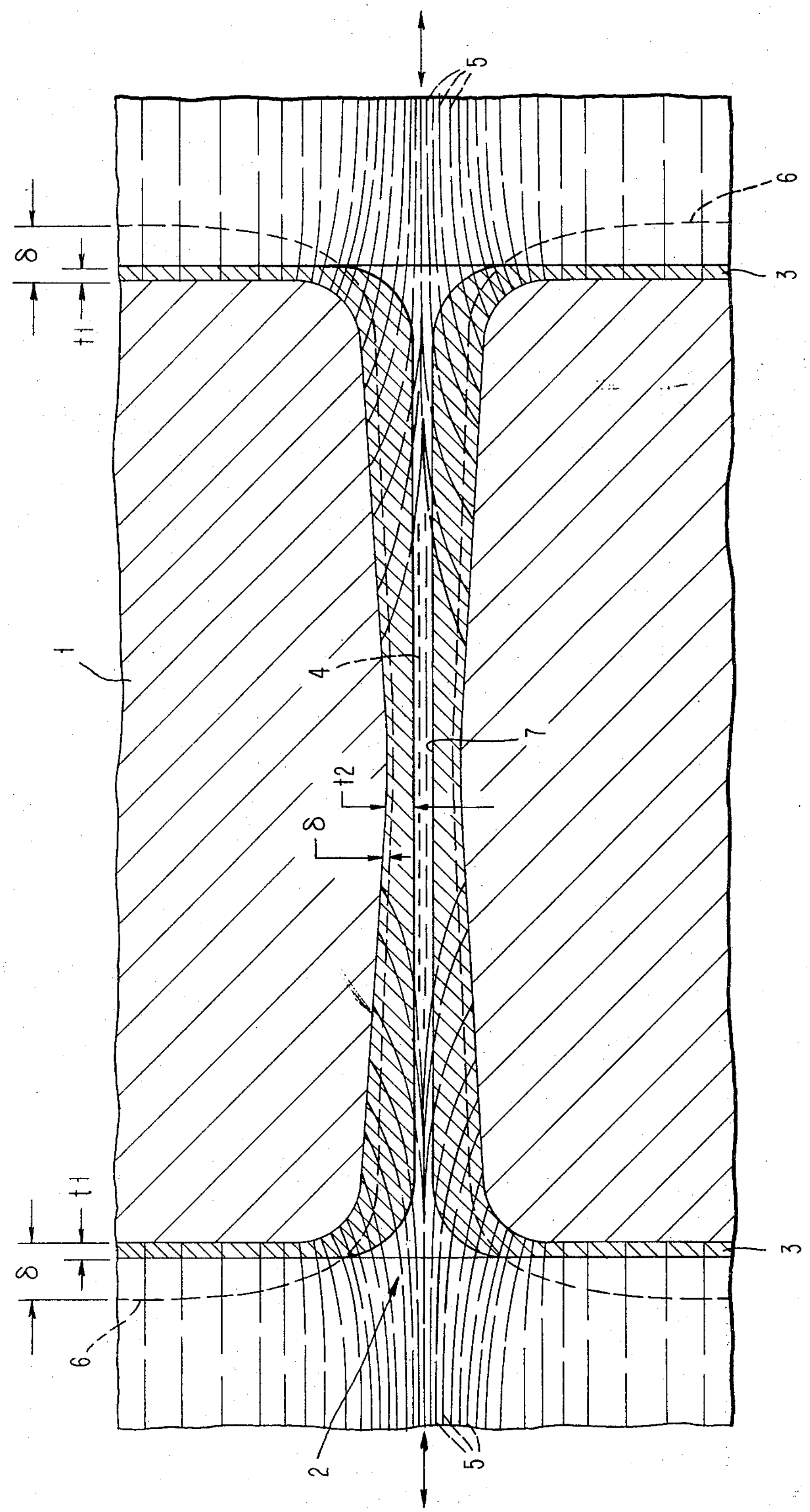
FIG. 6 is a cross-sectional view of a substrate containing a through-hole which has a "double taper." Also shown are the primary current distributions under conditions of reversible flow of electroplating solution. The current distributions, the thicknesses, $t1$, $t2$, of plated material and the thicknesses $\delta$ of the diffusion layer are the same as obtained in FIG. 5 where only a single taper is utilized, except the through-hole is twice as long.

Referring now to FIG. 6 there is shown therein a substrate 1 containing a through-hole 2 of approximately twice the length shown in FIG. 5. In fact, FIG. 6 is merely a pair of tapered holes 2 which are in effect connected together, each of which is identical in every respect with the tapered hole shown in FIG. 5. In the arrangement of FIG. 6, hole 2 has what may be characterized as a "double taper." Apart from the fact that hole 2 has a double taper, the flow of electroplating solution 4 is periodically or intermittently reversed as indicated by the double headed arrows during the plating operation. Thus, for one portion of the plating cycle, solution 4 flowing from left to right in FIG. 6 provides a build-up of layer 3 on the left most tapered portion of hole 2. At this point, the flow of solution through hole 2 is reversed and a similar build-up is obtained in the rightmost portion of tapered hole 2 by forcing solution 4 from right to left. After a number of reversals of electroplating solution 4 through double tapered hole 2, it is completely filled with the exception of a hair-like channel 7 which extends completely through the double tapered portion. By reversing the flow of plating solution, it is possible to obtain a substantially completely filled hole which is twice as long as holes obtained using unidirectional flow.

Figures 7, 8:
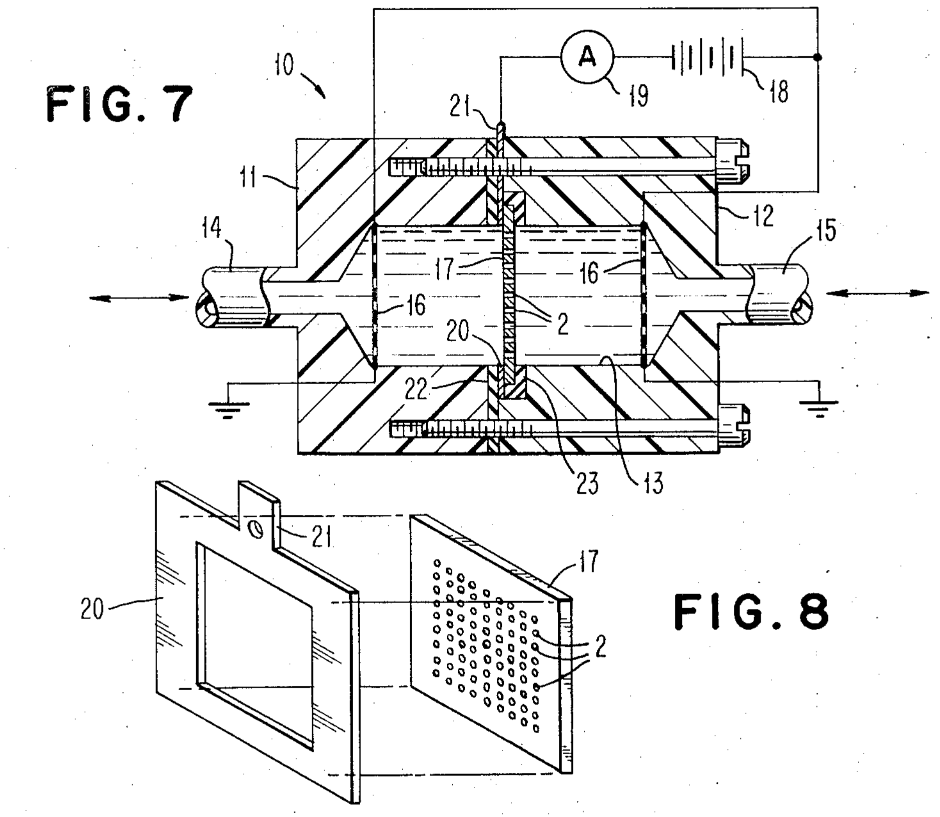
FIG. 7 is a partial cross-sectional, partial schematic diagram of apparatus utilized in plating through-holes which have either a single or double taper. The substrate containing the through-holes acts as a cathode in the plating arrangement.
FIG. 8 is a perspective view of a substrate containing holes to be plated and a conductive contact element which carries current from an external source to the substrate. In all cases, the substrate is metallic or is rendered conductive by electrolessly plating or is metallized by other methods when the substrate is initially insulating in character.

To this point in the discussion of the present invention, no mention has been made for carrying out the actual plating of tapered through-holes. Such an apparatus is shown in FIGS. 7 and 8. Electroplating apparatus 10 consists of mating sections 11 and 12 from which identical portions have been removed such that, when mated, a chamber 13 is formed. Input-output ports 14, 15 connect chamber 13 to reservoirs of electroplating solution (not shown). Anodes 16 in the form of metallic screens are disposed within chamber 13 and extend across the openings to input-output ports 14, 15 and in the flow path of electroplating solution.

A cathode 17 which is a substrate containing holes to be plated, is disposed intermediate anodes 16 and in the flow of electroplating solution. Cathode 17, as indicated previously, may be conductive or may be of insulating material which has been electrolessly plated to render its surface portion and the interior of the holes to be plated conductive. Cathode 17 is connected to the negative side of a battery 18 via an ammeter 19, while anodes 16 are connected to the positive side of battery 18. A conductive electrode 20 which is shown in perspective in FIG. 8 butts up against the periphery of cathode 17 to provide via a tab 21 a current path to battery 18. Gaskets 22, 23 are provided where sections 11, 12 mate to prevent the escape of electroplating solution from chamber 13. Anodes 16 may be made of copper or platinum mesh while electrode 20 may also be made of copper. The make-up of anodes 16, gaskets 22, 23 and cathode 17 depends on what metal is to be plated. During plating of through-holes in cathode 17 in FIG. 7, electroplating solution is continuously pumped through the plating apparatus and, where cathode 17 contains holes having a double taper, the direction of the plating solution flow is reversed periodically.

The following is an example of a complete process for plating through-holes in accordance with the teaching of the present invention. A typical substrate may consist of alumina or sapphire having dimensions as shown in the following Table I:

TABLE I

| | |
|---|---|
| Hole diameter (maximum) | 1.0 mil. |
| Hole length | 10 to 11 mils. |
| Hole spacing | 2 mil centers. |
| 100% of holes to have electrical resistance. | <30 milliohms per hole. |
| Width of etched interconnection wires | 1 mil. |
| Thickness of etched interconnection wires. | 0.5 mil. |

The holes are made by electron beam or laser machining and are provided with a taper of approximately 1° to 15°. The alumina has better than a 1.0 RMS finish. Based on the resistivity of pure annealed copper, one mil holes should give 18.5 milliohms resistance. This means that if only about 30% of the cross-sectional area of a one mil hole were filled with copper, this specification would be met. However, since electroplated copper, at best, can have only 80% to 90% of the conductivity of pure annealed copper and, since in approximately 1000 holes per wafer, one could expect some statistical distribution about the mean, it became apparent that to meet the requirement of 100% of the holes having a resistance of 30 milliohms, it would be necessary to plate until the holes were nearly completely filled with copper. This criterion as indicated hereinabove in connection with FIGS. 5 and 6 is met by following the teaching of the present invention.

After electron beam machining, the wafer is cleaned with hot phosphoric acid to remove electron machining burrs. The wafer is then sensitized and activated with $SnCl_2$ and $PdCl_2$, respectively. When necessary, a commercially available wetting agent is used in the $SnCl_2$ and $PdCl_2$ solution to improve wetting.

After the last immersion in $PdCl_2$, the wafer is not rinsed but is dried by a jet of air and is then plated for approximately fifteen to twenty minutes in a commercially available electroless copper plating bath. Electroless plating is carried out in the presence of agitation, by moving the wafer back and forth to promote an exchange of the plating solution inside the holes and to facilitate the removal of hydrogen bubbles. Following the electroless metallizing step and post-baking to improve adhesion, the wafer is electroplated in the apparatus of FIG. 7 under the conditions specified in the following Table II:

TABLE II

| | |
|---|---|
| Plating bath | Unichrome pyrophosphate copper (no additives). |
| pH | 8.3±0.1. |
| Temperature | 50° C. |
| Pressure | 13 inches of water (constant). |
| Current density | 9.5 ma./cm.$^2$ (average). |
| Anodes | Copper wire mesh. |
| Cathode | Ceramic chip with 900 1 mil diameter tapered holes metallized with electroless copper. |
| Agitation | Convection by forced flow through tapered holes. |
| Initial flow rate [1] | 20 cm.$^3$/mins. |

[1] Flow rate slows down with plating rate. After ten minutes of plating, the flow stops completely.

If the current density distribution were the same inside the holes as over the wafer surface, based on the number of coulombs, it would take approximately 80 minutes to fill the 1 mil diameter holes with copper. It takes only approximately ten to fifteen minutes, however, to substantially fill the holes with copper. Therefore, unlike the commonly used through-hole plating process where the ratio of deposit thickness outside the hole to that inside the hole can never be smaller than 1.0, in the present flow through plating process, the ratio can be smaller than 1.0 and can even be as small as 0.1. The resulting plated holes, using the technique of the present application, have an average resistance three to five times smaller than permissible; more than meeting the criterion of 30 milliohms resistance.

Instead of obtaining tapered holes by electron beam machining alone, it is possible to obtain tapered holes by machining holes of minimum diameter with an electron or laser beam. Subsequently the wafer is placed in an apparatus similar to that shown in FIG. 7 except that anodes and electrical connections are not used and, an etchant for alumina or sapphire is flowed through the holes. A typical etchant for alumina is phosphoric acid. By flowing the etchant unidirectionally, or reversibly, through the previously machined hole, single or double tapered holes, respectively, may be obtained. The taper results from the fact that as the etchant flows into the hole, it becomes depleted of etching material as it flows through the hole and, as such, a higher etching rate is obtained near the entrance to the hole than deeply within the hole. In this manner, a tapered hole of desired dimensions can be provided which avoids the difficulties inherent in electron or laser beam machining of tapered holes. In connection with the electroplating solutions utilized, it should be appreciated that any standard electroplating solution of high throwing power may be utilized. Also, the temperature at which plating occurs may be room temperature or higher. As a general criterion, the temperature at which deposition is carried out from a fluid carrying at least the metal to be plated should not be so high as to permit diffusion of the metal into the substrate during the time it takes to substantially completely fill the tapered hole.

While the invention has been paricularly shown and described with reference to preferred method steps thereof, it will be understood by those skilled in the art that the foregoing and other changes in details may be made therein without departing from the spirit and scope of the present invention.

What is claimed is:

1. In a method for substantially completely filling a substrate hole having at least a single uniform taper along the length thereof and a large length-to-diameter ratio the surfaces of which are amenable to metallization and being immersed in a fluid containing at least the metal to be deposited the step of:

flowing said fluid through said hole in a direction of decreasing hole diameter by forced convection for a time sufficient to substantially completely fill said hole and at a temperature below which diffusion of said metal into said substrate can occur during said time.

2. A method for filling small diameter through-holes in a substrate substantially completely, said holes having a large length-to-diameter ratio comprising the steps of:

forming at least a single hole in said substrate at least the surfaces of which are amenable to metallization said hole having at least a single uniform taper along the length thereof and a diameter which decreases with increasing substrate depth and, flowing a fluid containing at least the metal which is to be deposited on said surfaces by forced convection through said hole in the direction of decreasing hole diameter for a time sufficient to substantially completely fill said hole and at a temperature below which diffusion of said metal into said substrate can occur during said time.

3. A method according to claim 2 wherein said fluid is an electroplating solution.

4. A method according to claim 2 wherein said fluid is a gas.

5. A method according to claim 2 wherein the step of forming includes the step of machining a tapered hole in said substrate by one of laser beam and electron beam machining.

6. A method according to claim 2 wherein the step of forming includes the steps of:

machining a straight hole in said substrate, immersing said substrate in an etchant, and forcing said etchant through said hole to taper said hole.

7. A method according to claim 6 further including the step of:

electrolessly plating said surfaces of said substrate prior to the step of immersing.

8. A method according to claim 7 wherein said taper has an angle up to 15°.

9. In an electroplating method for substantially completely filling a hole in a substrate which is immersed in a plating solution, said hole having at least a single uniform taper and a large length-to-diameter ratio, the surface of which is amenable to electroplating the step of:

flowing said solution by forced convection through said hole in a direction of decreasing hole diameter for a time sufficient to substantially completely fill said hole.

10. A method for electroplating small diameter through-holes with large length-to-diameter ratios comprising the steps of:

forming at least a single hole in a substrate at least the surfaces of which are conductive, said hole having at least a single uniform taper along the length thereof and a diameter which decreases with decreasing substrate depth, immersing said substrate in an electroplating solution, and subjecting said hole to electroplating while simultaneously forcing said solution through said hole in the direction of decreasing diameter of said at least a hole for a time sufficient to substantially completely fill said hole.

11. A method according to claim 10 wherein the step of forming includes the step of electron beam machining a tapered hole in said substrate.

12. A method according to claim 10 wherein the step of forming includes the steps of:

electron beam machining a straight hole in said substrate, immersing said substrate in an etchant, and forcing said etchant through said hole to taper said hole.

13. A method according to claim 10 wherein said substrate is an insulator.

14. A method according to claim 10 further including the step of:

electrolessly plating said surfaces of said substrate prior to said step of immersing.

15. In a method for substantially completely filling a substrate hole having a double uniform taper along the length thereof and a large length-to-diameter ratio the surfaces of which are amenable to metallization and being immersed in a fluid containing at least the metal to be deposited the step of:

flowing said fluid through said hole by forced convection in alternately opposite directions to metallize that portion of said double taper having decreasing diameter in the direction of flow for a time sufficient to substantially completely fill said hole and at a temperature below which diffusion of said metal into said substrate can occur during said time.

16. A method for filling small diameter through-holes in a substrate substantially completely with a metal, said holes having a large length-to-diameter ratio comprising the steps of:

forming at least a single hole in said substrate at least the surfaces of which are amenable to metallization said hole having a double uniform taper each portion of which has a diameter which decreases with increasing substrate depth to the midpoint of said substrate, and flowing a fluid containing at least the metal which is to be deposited on said surfaces by forced convection through said hole in alternately opposite directions to incrementally metallize that portion of said double taper having a decreasing diameter in the direction of flow and then the other for a time sufficient to substantially completely fill said hole and at a temperature below which diffusion of said metal into said substrate can occur during said time.

17. A method according to claim 16 wherein said fluid is a gas.

18. A method according to claim 16 wherein said fluid is an electroplating solution.

19. A method according to claim 16 further including the step of:

electrolessly plating said surfaces of said substrate after said forming step.

20. A method according to claim 19 wherein said taper has an angle up to 15°.

21. A method for electroplating small diameter through-holes with large length-to-diameter ratios comprising the steps of:

forming at least a single hole in a substrate at least the surfaces of which are conductive, said hole having a double uniform taper, immersing said substrate in an electroplating solution, and subjecting said hole to electroplating while simultaneously forcing said solution through said hole in alternately opposite directions to metallize that portion of said taper having decreasing diameter in the direction of flow for a time sufficient to substantially fill said hole.

22. A method according to claim 21 wherein the step of forming includes the step of machining a double taper in said substrate.

23. A method according to claim 21 wherein the step of forming includes the steps of:

machining a straight hole in said substrate, immersing said substrate in an etchant, and forcing said etchant back and forth through said hole to form said double taper.

24. A method according to claim 21 wherein said substrate is an insulator.

25. A method according to claim 21 wherein said double taper has an angle of up to 15°.

26. A method according to claim 21 further including the step of:

electrolessly plating said surface of said substrate prior to the step of immersing.

References Cited

UNITED STATES PATENTS

| | | | |
|---|---|---|---|
| 3,424,667 | 1/1969 | Frank | 204—24 |
| 883,756 | 4/1908 | Steiner | 204—26 |
| 3,461,045 | 8/1969 | Franks | 204—9 |
| 3,520,357 | 7/1970 | Bruner | 204—9 |
| 2,051,663 | 8/1936 | Werth | 204—15 |
| 2,217,334 | 10/1940 | Diggory et al. | 204—15 |

FOREIGN PATENTS

| | | | |
|---|---|---|---|
| 1,162,660 | 2/1964 | Germany | 204—26 |
| 686,445 | 4/1930 | France | 204—15 |

JOHN H. MACK, Primary Examiner

T. TUFARIELLO, Assistant Examiner

U.S. Cl. X.R.

117—95; 204—26